(12) United States Patent
Farbolin (10) Patent No.: US 8,490,915 B2
(45) Date of Patent: Jul. 23, 2013

(54) RAM AIR RIGID STRUCTURE GLIDER (76) Inventor: Christopher Paul Farbolin, Atlanta, GA (US)

( * ) Notice: Subject to any disclaimer, the term of this patent is extended or adjusted under 35 U.S.C. 154(b) by 181 days.

(21) Appl. No.: 13/187,482

(22) Filed: Jul. 20, 2011

(65) Prior Publication Data
US 2012/0018568 A1 Jan. 26, 2012

Related U.S. Application Data (60) Provisional application No. 61/365,816, filed on Jul. 20, 2010.

(51) Int. Cl.
*B64C 31/02* (2006.01)
(52) U.S. Cl.
USPC ........... 244/16; 244/900; 244/902; 244/153 R
(58) Field of Classification Search
USPC ........ 244/16, 142, 144, 145, 153 R, 900–902
See application file for complete search history.

(56) References Cited

U.S. PATENT DOCUMENTS

| 5,160,100 A | * | 11/1992 | Snyder | 244/13 |
| 5,884,863 A | * | 3/1999 | Fisher et al. | 244/49 |

* cited by examiner

*Primary Examiner* — Tien Dinh
*Assistant Examiner* — Nicholas McFall
(74) *Attorney, Agent, or Firm* — Sinorica, LLC (57) ABSTRACT The present invention is a ram air rigid structure glider, which uses both ram air inflation and a rigid structure in order to produce the necessary aerodynamic lift to glide through the air. The frame uses two main structural beams, the spar and the keel, to form the general shape of the wings and the tail. The hubs and the network of lines expand the structure laid out by the spur and the keel. The hubs are evenly placed along the spur, and the network of lines are connected and criss-crossed in between the hubs. The sail is a piece fabric wrapped around the frame and has a plurality of cells, which are evenly spaces throughout the sail. The plurality of cells allows the sails to be inflated by ram air pressure. The pilot pod carries the user in the supine position and is attached to the frame.

20 Claims, 8 Drawing Sheets

RAM AIR RIGID STRUCTURE GLIDER

The current application claims a priority to the U.S. Provisional Patent application serial number 61/365,816 filed on Jul. 20, 2010.

FIELD OF THE INVENTION

The present invention relates generally to an air glider, more specifically a glider with characteristics of both a hang glider and a paraglider.

BACKGROUND OF THE INVENTION

Traditionally, the air gliders have either used ram air inflation or a rigid structure as a means of aerodynamic lift. A paraglider inflates a cell structured canopy with ram air pressure in order to produce the necessary aerodynamic lift to glide an individual through the air. The cell structured canopy allows the individual to better control of the paraglider but glides at a slower speed. The paraglider usually requires no assembly and relatively weighs less than an air glider with a frame. A hang glider uses a rigid structure and fabric to form its wings, which produces the necessary aerodynamic lift to glide an individual through the air. The rigid structured wings allow the hang glider to glide at faster speeds but reduce the individual's ability to the control the hang glider. Because the hang glider has a frame, the hang glider requires some assembly time and relatively weighs more than the paraglider. The present invention is an air glider, which uses both ram air inflation and a rigid structure. The wings of the present invention provide the aerodynamic lift necessary to glide an individual through the air and is shaped by both ram air inflation and a rigid structure. The cell structure of the wings allows the present invention better maneuverability than a hang glider, while the rigid structure of the wings allows the present invention to glide at speeds faster than a paraglider. The present invention is relatively easier to assemble than a hang glider and has a weight comparable to the weight of a paraglider.

DETAIL DESCRIPTIONS OF THE INVENTION

All illustrations of the drawings are for the purpose of describing selected versions of the present invention and are not intended to limit the scope of the present invention.

Figure 1:
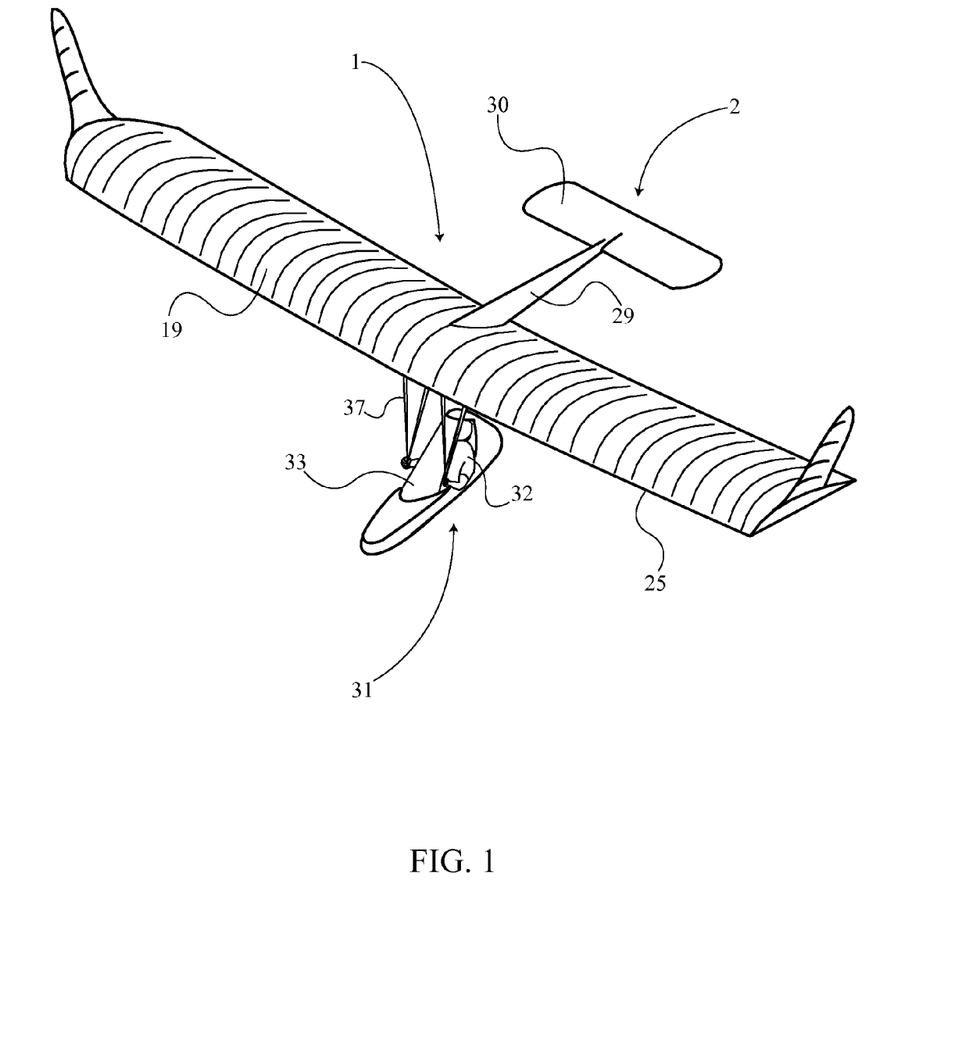
FIG. 1 is a perspective view of the present invention.
Figure 2:
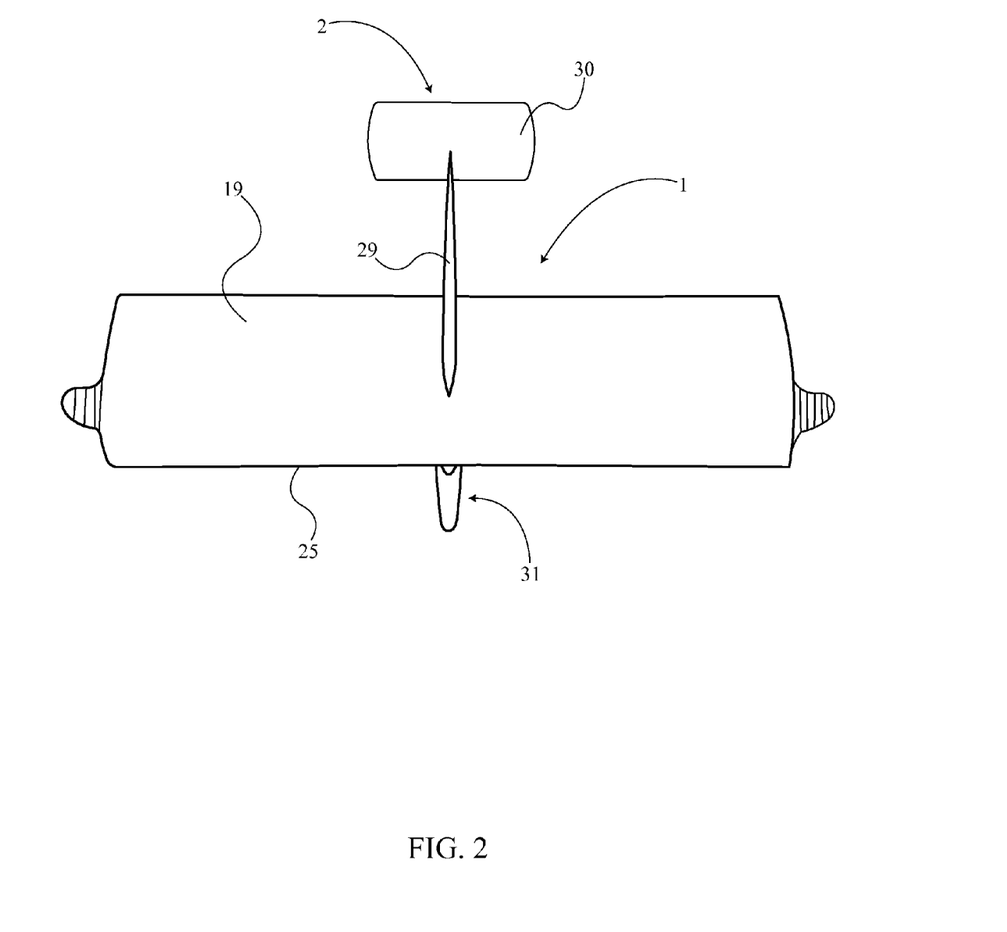
FIG. 2 is a top view of the present invention.

As in seen in FIGS. 1 and 2, the present invention is a ram air rigid structure glider, which allows a user to glide through the air. The wings and tail of the present invention is shaped by a combination of a rigid structure and ram air inflation. The present invention is collapsible and can be stored in small areas such as the trunk of an automobile, a storage compartment on a bus or train, or a closet. The ram air rigid structure glider comprises a pair of wings 1, a tail 2, a frame 3, a sail 19, a keel cone 29, a tail cover 30, a pilot pod 31, a left turning mechanism 35, and a right turning mechanism 36. The pair of wings 1 provides the present invention with the aerodynamic lift to keep the present invention gliding through the air. The tail 2 provides the present invention with the longitudinal stability to prevent any movement in the pitch while the present invention is in flight. The frame 3 is the rigid structure and provides a base for all the other components of the present invention to be connected together. The sail 19, the keel cone 29, and the tail cover 30 envelop the frame 3 and allow the pair of wings 1 and the tail 2 to be pressurized with ram air inflation. The pilot pod 31 carries the user while the present invention is gliding through the air. The left turning mechanism 35 and the right turning mechanism 36 allows the user to turn the present invention left or right while the present invention is in flight.

Figure 3:
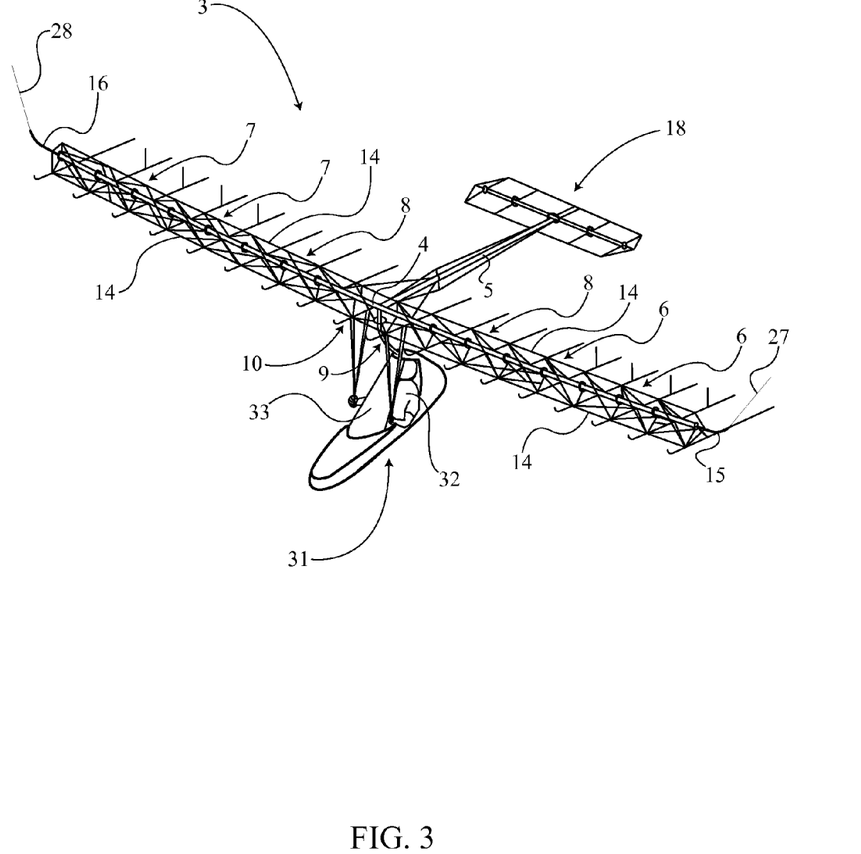
FIG. 3 is a perspective view of the frame of the present invention.

The present invention is structurally defined by the frame 3 as shown in FIG. 3. The frame 3 comprises a spar 4, a keel 5, a plurality of left outer hubs 6, a plurality of right outer hubs 7, a plurality of intermediate hubs 8, a left control hub 9, a right control hub 10, a network of lines 14, a left network connection 15, a right network connection 16, a skid 17, and a tail frame 18. The spar 4 is the main structural beam that runs along the length of the pair of wings 1. The spar 4 acts as a cantilever on which each of the pair of wings 1 are founded upon. The keel 5 is another structural beam that positions and supports the tail 2 at an appropriate distance away from the pair of wings 1. The keel 5 is perpendicularly attached to the center of the spar 4. The tail frame 18 is the structure of the tail 2 and perpendicularly attached to the keel 5 opposite to the spar 4. The tail frame 18 is positioned so that the length of tail frame 18 is parallel to the spar 4. The skid 17 is a rod shaped to prevent the tail 2 from getting damaged while the present invention is landing. The skid 17 is attached to the bottom of the keel 5 beneath the tail frame 18. The left network connection 15 is connected to the left end of the spar 4, and the right network connection 16 is connected to the right end of the spar 4. The left network connection 15 and the right network connection 16 are both angled rods and are used as connection points for other components of the present invention.

The hubs and the network of lines 14 are used to expand the structure laid out by the spar 4 and the keel 5. The hubs are defined by their position along the spar 4 and according to their functionality. The plurality of left outer hubs 6 is positioned along the spar 4 adjacent to the left network connection 15, and the plurality of right outer hubs 7 is positioned along the spar 4 adjacent to the right network connection 16. The plurality of left outer hubs 6 and the plurality of right outer hubs 7 are used to reshape the pair of wings 1 so that the present invention can turn left or right while gliding through the air. The left control hub 9 is positioned along the spar 4 adjacent to the left side of the keel 5, and the right control hub 10 is positioned along the spar 4 adjacent to the right side of the keel 5. The left turning mechanism 35 allows the user to access the plurality of left outer hubs 6 through the left control hub 9. Similarly, the right turning mechanism 36 allows the user to the access the plurality of right outer hubs 7 through the right control hub 10. The plurality of intermediate hubs 8 is positioned in between the plurality of left outer hubs 6 and the left control hub 9 and in between the plurality of right outer hubs 7 and the right control hub 10. The plurality of intermediate hubs 8 maintains the structure of the pair of wings 1 with any other specified purpose. Each of the plurality of left outer hubs 6, each of the plurality of right outer hubs 7, each of the plurality of intermediate hubs 8, the left control hub 9, and the right control hub 10 are each comprised a ring 11, a plurality of spokes 12, and a thick batten 13. For each hub, the plurality of spokes 12 is radially connected around the ring 11. The thick batten 13 is a rod connected to the bottom of the plurality of spokes 12 so that the thick batten 13 is both perpendicular to the spar 4 and parallel to the keel 5. The ring 11 of each of the hubs are traversed through by the spar 4 and are able to slide along the spar 4. The network of lines 14 is connected to the plurality of spokes 12 of each of the hubs and the keel 5. The left end of the network of lines 14 is attached to the left network connection 15, and the right end of the network of lines 14 is attached to the right network connection 16. Once the network of lines 14 is attached to the left network connection 15 and the right network connection 16, the network of lines 14 will experience tension, will evenly space out the hubs along the spar 4 and will hold the hubs in their proper position. In the preferred embodiment of the present invention, the network of lines 14 are made of Vectran lines, which are capable of dealing with the large tension force placed on the network of lines 14. The thick batten 13 of each of the hubs shapes the bottom of the pair of wings 1.

Figure 4:
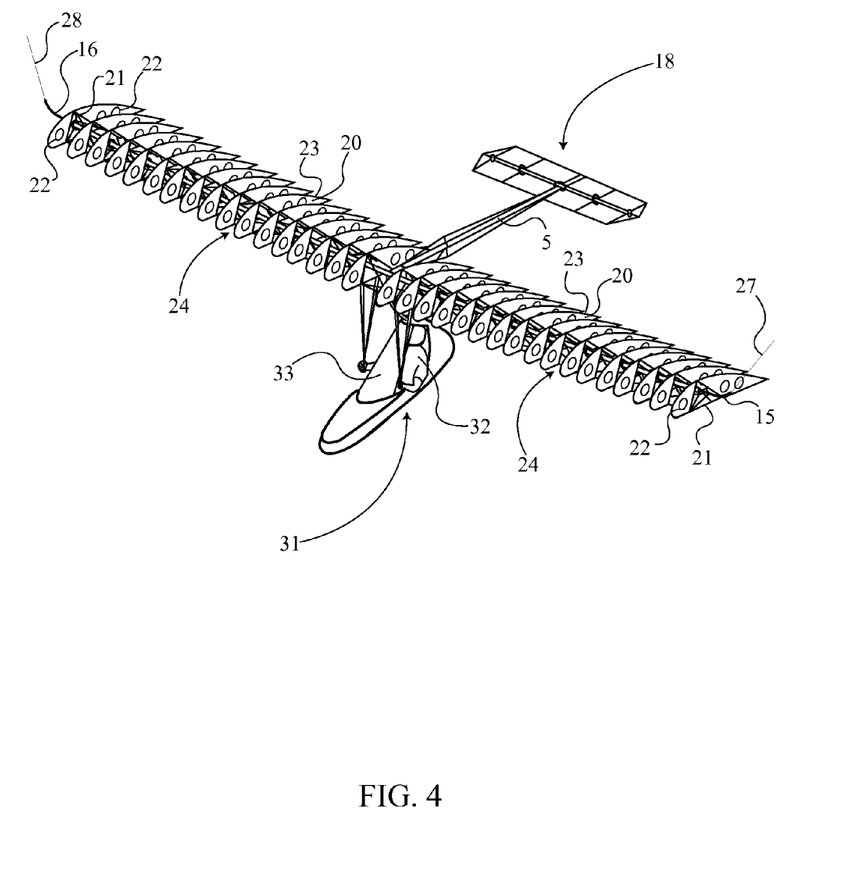
FIG. 4 is a perspective view of the frame of the present invention highlighting the position of each of the plurality of cells.
Figure 8:
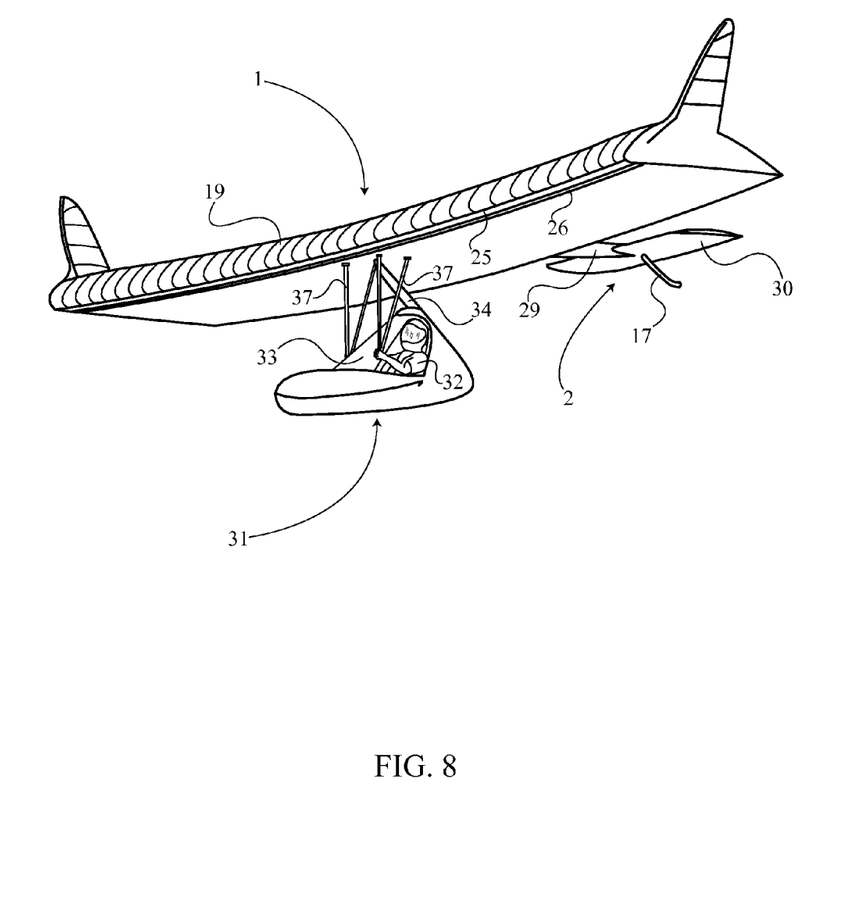
FIG. 8 is a bottom perspective view of the present invention.

The sail 19 is a sheet of material wrapping around the spar 4 and the hubs in a cylindrical manner, which forms the shape of the pair of wings 1. In the preferred embodiment of the present invention, the sail 19 is made of a lightweight nylon cloth. The sail 19 comprises a plurality of internal divisions 20, a plurality of thin battens 23, a plurality of cells 24, a leading edge 25, a ram air mouth 26, a left tip wand 27, and a right tip wand 28. As can be seen in FIG. 4, the plurality of internal divisions 20 is sheets of material, which perpendicularly intersect the sail 19 and are evenly positioned from each other. Each of the plurality of internal divisions 20 comprises a network hole 21 and a plurality of flow holes 22. The network hole 21 for all of the hubs are positioned collinearly with each other so that the network of lines 14, the plurality of spokes 12 of each of the hubs, the ring 11 of each of the hubs, and the spar 4 are able to traverse through the plurality of internal divisions 20. The plurality of flow holes 22 is positioned around the network hole 21 of each of the plurality of internal divisions 20. The plurality of thin battens 23 delineates each of the plurality of internal divisions 20 and is sewn into the sail 19. Each of the plurality of thin battens 23 is shaped like a typical airfoil, which allows the sail 19 to maintain the shape of a typical airfoil throughout the length of the pair of wings 1. In the preferred embodiment, the plurality of thin battens 23 is made of carbon fiber tubing, which is sturdy and flexible enough to maintain the typical airfoil shape. The leading edge 25 is the edge of the sail 19 that initially cuts into the air while the present invention is in flight. The leading edge 25 is located on the front of the pair of wings 1 and runs along the length of the pair of wings 1. The leading edge 25 is a part of the typical airfoil shape formed by the plurality of thin battens 23. The plurality of cells 24 is spaces within the sail 19, which are formed by the plurality of internal divisions 20, and allows the pair of wings 1 to be pressurized by the ram air inflation. The plurality of cells 24 is pressurized by air continuously flowing into the pair of wings 1 through the ram air mouth 26 while the present invention is in flight. The ram air mouth 26, which is shown in FIG. 8, is a hole in the sail 19 covered by a mesh material that runs along the length of the pair of wings 1 below the leading edge 25. The mesh material of the ram air mouth 26 allows air to freely flow into the plurality of cells 24. If each of the plurality of cells 24 are not evenly pressurized by the air flowing through the ram air mouth 26, then the air will flow through the plurality of flow holes 22 until the plurality of cells 24 is evenly pressurized. The left tip wand 27 is a straight rod covered by the left end of the sail 19, and the right tip wand 28 is a straight rod covered by the right end of the sail 19. Once the left tip wand 27 and the right tip wand 28 are respectively attached to the end of the left network connection 15 and the end of right network connection 16, the left tip wand 27 and the right tip wand 28 serve as a yaw stabilizer while the present invention is in flight. The sail 19 is also attached to the frame 3 along the hubs. The thick batten 13 for each of the hubs is sewn into every other of the plurality of internal divisions 20 above the bottom of the thin batten.

The tail 2 is pressurized by ram air inflation just like the pair of wings 1, but the tail 2 does not have direct access to the ram air mouth 26. The tail frame 18 is enveloped by the tail cover 30 except on the portion of the tail frame 18 attached to the keel 5. Similarly, the keel 5 is enveloped by the keel cone 29 except on the portions of the keel 5 attached to the spar 4 and to the tail frame 18. The keel cone 29 is connected to the sail 19 at one end and is attached to the tail cover 30 on the other end. The keel cone 29 guides the air flowing through the ram air mouth 26 into the tail cover 30, which keeps both the pair of wings 1 and the tail 2 pressurized.

Due to a lack of nose structure in the frame 3, the pilot pod 31 carries the user in the supine position, which allows the user to shift their weight in order to control the pitch while the present invention is in flight. The pilot pod 31 is designed to be aerodynamic so that the pilot pod 31 does not produce any unnecessary drag on the present invention. The pilot pod 31 comprises a pilot cavity 32, a windshield 33, and a pod support beam 34. The pilot cavity 32 is the space within the pilot pod 31 that the user places their body. The pilot cavity 32 should be in shaped in such a way that the pilot cavity 32 provides the user a place stretch their legs in the supine position and a back rest to lean against. The windshield 33 is positioned over the opening of the pilot cavity 32 so that the user is protected from the wind and flying debris. The windshield 33 prevents the pilot cavity 32 from producing unnecessary drag on the present invention. The windshield 33 does not completely cover the entire opening of the pilot cavity 32, which allows the user to stick their arms out of the pilot cavity 32 and access the left turning mechanism 35 and the right turning mechanism 36. The pod support beam 34 attaches the pilot pod 31 to the spar 4 and is designed to be very sturdy because the pod support beam 34 holds a significant portion of the present invention's total weight to the spar 4.

Figure 6:
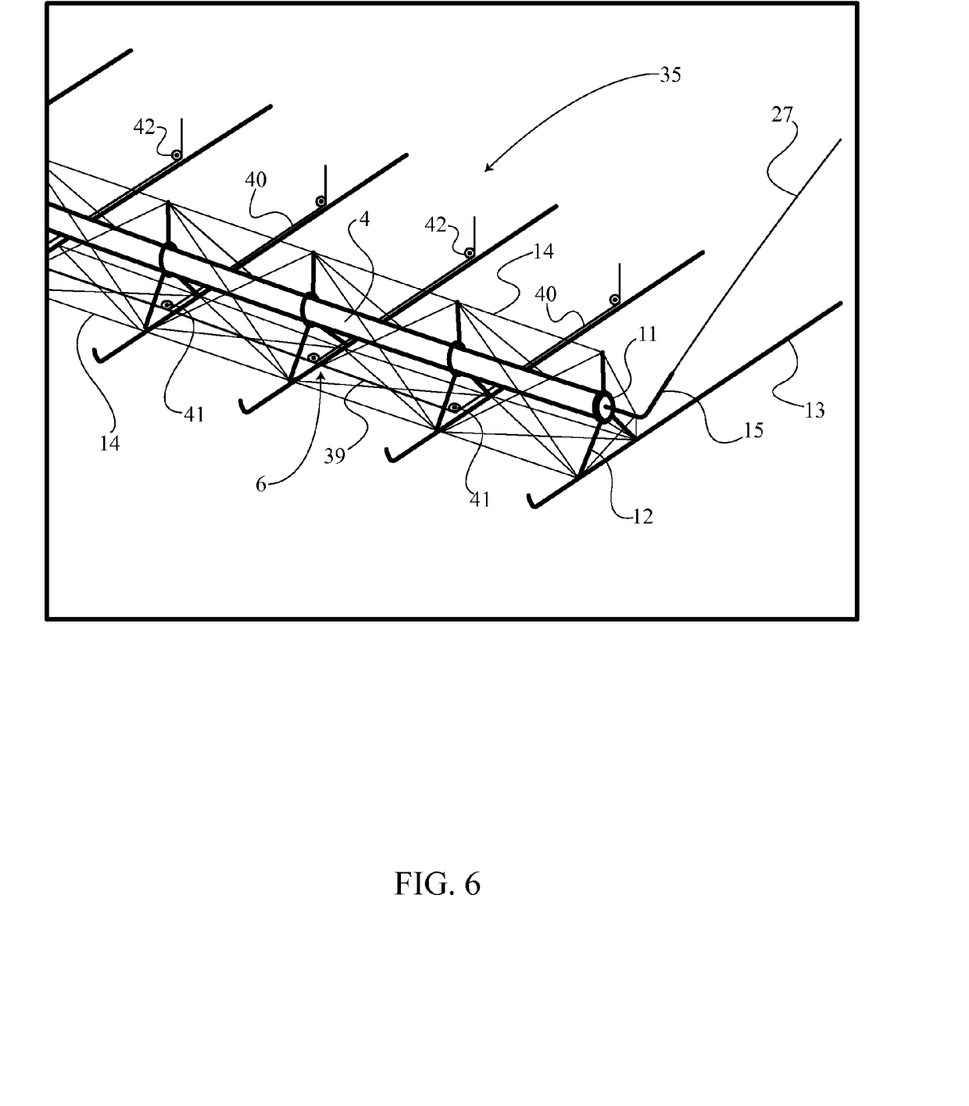
FIG. 6 is a magnified view of the left side of the frame.

The left turning mechanism 35 and the right turning mechanism 36 allows the user to steer while the present invention is in flight. The left turning mechanism 35 and the right turning mechanism 36 each comprises a control stem 37, a pull tube 38, a primary control line 39, a plurality of secondary control lines 40, a plurality of horizontal pulleys 41, and a plurality of vertical pulleys 42. For the left turning mechanism 35 shown in FIGS. 6 and 7, the control stem 37 is attached to the thick batten 13 of the left control hub 9, which appropriately positions the control stem 37 on the left side of the pilot pod 31. The control stem 37 is also jointly attached to one end of the pull tube 38. In the rest position, the pull tube 38 is positioned above and parallel to the thick batten 13 of the left control hub 9. When the user moves the control stem 37 of the left turning mechanism 35, the other end of the pull tube 38 moves towards the center of the spar 4. The other end of the pull tube 38 is connected to the primary control line 39, which is pulled inwards by the pull tube 38 when the user moves the control stem 37 of the left turning mechanism 35. The primary control line 39 is located along the left side of the spar 4 and is parallel to the spar 4. Each of the plurality of secondary control lines 40 branches off the primary control line 39 adjacent to one of the plurality of left outer hubs 6. Each of the plurality of horizontal pulleys 41 is attached to the spar 4 adjacent to one of the plurality of left outer hubs 6, and each of the plurality of vertical pulleys 42 is attached to the thick batten 13 of one of the plurality of left outer hubs 6. The arrangement for the plurality of horizontal pulleys 41 and the plurality of vertical pulleys 42 allows each of the plurality of secondary control lines 40 to engage to one of the plurality of horizontal pulleys 41, engage to one of the plurality of vertical pulleys 42, and attach to the sail 19 directly above one of the plurality of left outer hubs 6. When the primary control line 39 is pulled inwards, the tension felt by the primary control line 39 is transferred to the plurality of secondary control lines 40. The tension felt by the plurality of secondary control lines 40 is translated into a horizontal force by the plurality of horizontal pulleys 41. The horizontal force felt by the plurality of secondary control lines 40 is again translated into a vertical force by the plurality of vertical pulleys 42. The vertical force pulls down the portion of the sail 19 adjacent to the plurality of left outer hubs 6, exposes more of the ram air mouth 26 on that portion of the sail 19 to the oncoming wind, produces more drag on that portion of the sail 19, and turns the present invention to the left.

Figure 5:
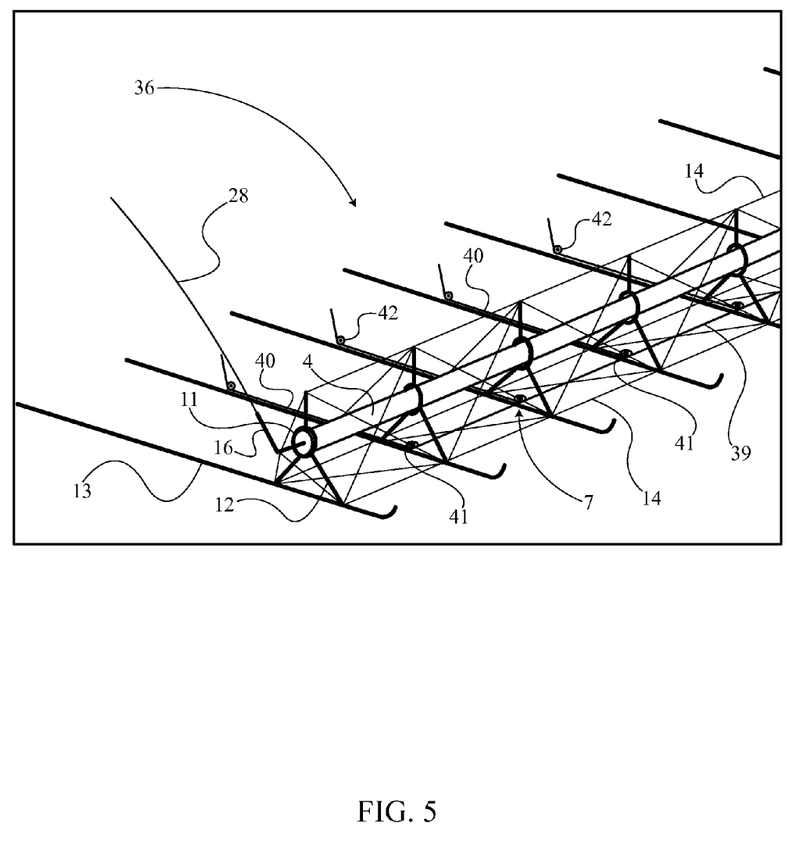
FIG. 5 is a magnified view of the right side of the frame.
Figure 7:
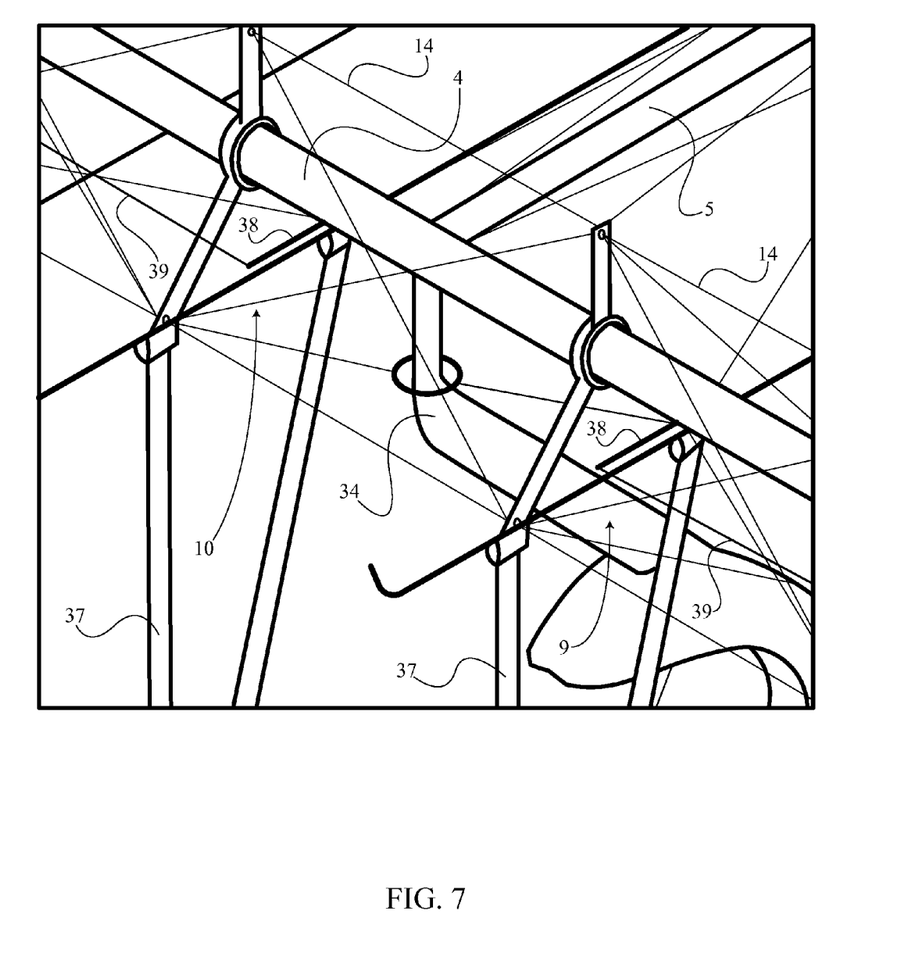
FIG. 7 is a magnified view of the center of the frame.

The components of the right turning mechanism 36, shown in FIGS. 5 and 7, work in a similar manner to the components of the left turning mechanism 35. For the right turning mechanism 36, the control stem 37 is attached to the thick batten 13 of the right control hub 10, which appropriately positions the control stem 37 on the right side of the pilot pod 31. The control stem 37 is also jointly attached to one end of the pull tube 38. In the rest position, the pull tube 38 is positioned above and parallel to the thick batten 13 of the right control hub 10. When the user moves the control stem 37 of the right turning mechanism 36, the other end of the pull tube 38 moves towards the center of the spar 4. The other end of the pull tube 38 is connected to the primary control line 39, which is pulled inwards by the pull tube 38 when the user moves the control stem 37 of the right turning mechanism 36. The primary control line 39 is located along the right side of the spar 4 and is parallel to the spar 4. Each of the plurality of secondary control lines 40 branches off the primary control line 39 adjacent to one of the plurality of right outer hubs 7. Each of the plurality of horizontal pulleys 41 is attached to the spar 4 adjacent to one of the plurality of right outer hubs 7, and each of the plurality of vertical pulleys 42 is attached to the thick batten 13 of one of the plurality of right outer hubs 7. The arrangement for the plurality of horizontal pulleys 41 and the plurality of vertical pulleys 42 allows each of the plurality of secondary control lines 40 to engage to one of the plurality of horizontal pulleys 41, engage to one of the plurality of vertical pulleys 42, and attach to the sail 19 directly above one of the plurality of right outer hubs 7. When the primary control line 39 is pulled inwards, the tension felt by the primary control line 39 is transferred to the plurality of secondary control lines 40. The tension felt by the plurality of secondary control lines 40 is translated into a horizontal force by the plurality of horizontal pulleys 41. The horizontal force felt by the plurality of secondary control lines 40 is again translated into a vertical force by the plurality of vertical pulleys 42. The vertical force pulls down the portion of the sail 19 adjacent to the plurality of right outer hubs 7, exposes more of the ram air mouth 26 on that portion of the sail 19 to the oncoming wind, produces more drag on that portion of the sail 19, and turns the present invention to the right.

The present invention can be disassembled and can be packaged into a small container for easy transport or storage. The first step to disassemble the present invention is to detach the left tip wand 27 from the end of the left network connection 15 and to detach the right tip wand 28 from the end of the right network connection 16. The first step reduces the tension in the sail 19. The second step is to detach the left end of the network of lines 14 from the left network connection 15 and to detach the right end of the network of lines 14 from the right network connection 16. The second step eliminates both the tension in the network of lines 14 and the tension along the sail 19. The third step is to rack the hubs, the network of lines 14, and the sail 19 toward the center of the spar 4, which reduces the majority of the total volume of the present invention. The fourth step is to detach the tail cover 30 from the keel cone 29 and rack the tail 2 towards the center of the spar 4 along the keel 5. The final step is to detach the pilot pod 31 and the keel 5 from the spar 4 and to disassemble the spar 4 into pieces.

Although the invention has been explained in relation to its preferred embodiment, it is to be understood that many other possible modifications and variations can be made without departing from the spirit and scope of the invention as hereinafter claimed.

What is claimed is:

1. A ram air rigid structure glider comprises,
   a pair of wings;
   a tail;
   a frame;
   a sail;
   a keel cone;
   a tail cover;
   a left turning mechanism;
   a right turning mechanism;
   a pilot pod;
   said frame comprises a spar, a keel, a plurality of left outer hubs, a plurality right outer hubs, a plurality of intermediate hubs, a left control hub, a right control hub, a network of lines, a left network connection, a right network connection, a skid, and a tail frame;
   said sail comprises a plurality of internal divisions, a plurality of thin battens, a plurality of cells, a leading edge, a ram air mouth, a left tip wand, and a right tip wand;
   said left turning mechanism and said right turning mechanism each comprises a control stem, a pull tube, a primary control line, a plurality of secondary control lines, a plurality of horizontal pulleys, and a plurality of vertical pulleys;
   said pilot pod comprises a pilot cavity, a windshield, and a pod support beam;
   each of said plurality of left outer hubs, each of said plurality of right outer hubs, each of said plurality of intermediate hubs, said left control hub, and said right control hub each comprises a ring, a plurality of spokes, and a thick batten; and
   said plurality of internal divisions comprises a network hole and a plurality of flow holes.

2. The ram air rigid structure glider as claimed in claim 1 comprises,
   said keel being positioned perpendicular to said spar;
   said keel being centrally attached to said spar;
   said left control hub being positioned adjacent to said keel along said spar;
   said right control hub being positioned adjacent to said keel opposite said left control hub along said spar;
   said plurality of left outer hubs being positioned adjacent to said left control hub opposite said keel along said spar;
   said plurality of right outer hubs being positioned adjacent to said right control hub opposite said keel along said spar;

said plurality of intermediate hubs being positioned in between said left control hub and said plurality of left outer hubs and being positioned in between said right control hub and said plurality of right outer hubs;
said left network connection being attached to said spar adjacent to said plurality of left outer hubs;
said right network connection being attached to said spar adjacent to said plurality of right outer hubs;
said tail frame being positioned parallel to said spar;
said tail frame being attached perpendicular to said keel opposite said spar;
said skid being positioned perpendicular to said spar; and
said skid being attached perpendicular to said keel opposite said spar.

3. The ram air rigid structure glider as claimed in claim 2 comprises,
said plurality of spokes being radially connected to said ring;
said thick batten being positioned perpendicular to said spar and being positioned parallel to said keel; and
said thick batten being connected below to said plurality of spokes.

4. The ram air rigid structure glider as claimed in claim 3 comprises,
said network of lines being attached to said left network connection and said right network connection;
said network of lines being attached to said plurality of spokes of said plurality of left outer hubs, to said plurality of spokes of said plurality of right outer hubs, to said plurality of spokes of said plurality of intermediate hubs, to said plurality of spokes of said left control hub, and to said plurality of spokes of said right control hub in between said left network connection and said right network connection; and
said ring of each of said plurality of left outer hubs, said ring of each of said plurality of right outer hubs, said ring of each of said plurality of intermediate hubs, said ring of said left control hub, and said ring of said right control hub being traversed through by said spar.

5. The ram air rigid structure glider as claimed in claim 1 comprises,
said sail being evenly partitioned by said plurality internal divisions;
said plurality of thin battens delineating each of said plurality of internal divisions along said sail;
said plurality of cells being shaped by said plurality of internal divisions within said sail;
said keel cone being centrally positioned on said sail opposite said leading edge; and
said ram air mouth being positioned adjacent to said leading edge.

6. The ram air rigid structure glider as claimed in claim 5 comprises,
said plurality of flow holes being positioned around said network hole; and
said network hole of each of the plurality of internal divisions being positioned collinear to each other.

7. The ram air rigid structure glider as claimed in claim 5 comprises,
said spar, said plurality of left outer hubs, said plurality of right outer hubs, said plurality of intermediate hubs, said left control hub, and said right control hub being enveloped by said sail;
said network hole of each of the plurality of internal divisions being traversed through by said network of lines;
said network hole of each of the plurality internal divisions being traversed through by said ring of each of said plurality of left outer hubs, by said ring of each of said plurality of right outer hubs, by said ring of each of said plurality of intermediate hubs, by said ring of said left control hub, and by said ring of said right control hub;
said network hole of each of the plurality internal divisions being traversed through by said plurality of spokes of each of said plurality of left outer hubs, by said plurality of spokes of each of said plurality of right outer hubs, by said plurality of spokes of each of said plurality of intermediate hubs, by said plurality of spokes of said left control hub, and by said plurality of spokes of said right control hub;
said thick batten of each of said plurality of left outer hubs, said thick batten of each of said plurality of right outer hubs, said thick batten of each of said plurality of intermediate hubs, said thick batten of said left control hub, said thick batten of said right control hub being sewn into every other of said plurality of internal divisions;
said left tip wand being draped over by said sail and being connected to said sail adjacent to said plurality of left outer hubs; and
said right tip wand being draped over by said sail and being connected to said sail adjacent to said to said plurality of right outer hubs.

8. The ram air rigid structure glider as claimed in claim 1 comprises,
said tail frame being enveloped by said tail cover;
said keel being covered by said keel cone; and
said tail cover being attached to said keel cone opposite said sail.

9. The ram air rigid structure glider as claimed in claim 1 comprises,
said control stem of said left turning mechanism being connected to said thick batten of said left control hub;
said control stem of said left turning mechanism being jointly attached to said pull tube of said left turning mechanism;
said pull tube of said left turning mechanism being attached to said primary control line of said left turning mechanism;
said primary control line of said left turning mechanism being connected to said plurality of secondary control lines of said left turning mechanism;
said plurality of horizontal pulleys of said left turning mechanism being attached to said spar adjacent to each of the plurality of left outer hubs;
said plurality of vertical pulleys of said left turning mechanism being attached to said thick batten of each of the plurality of left outer hubs;
said plurality of secondary lines of said left turning mechanism being engaged to both said plurality of horizontal pulleys of said left turning mechanism and said plurality of vertical pulleys of said left turning mechanism;
said sail being attached to said plurality of secondary control lines of said left turning mechanism opposite said primary control line of said left turning mechanism;
said control stem of said right turning mechanism being connected to said thick batten of said right control hub;
said control stem of said right turning mechanism being jointly attached to said pull tube of said right turning mechanism;
said pull tube of said right turning mechanism being attached to said primary control line of said right turning mechanism;
said primary control line of said right turning mechanism being connected to said plurality of secondary control lines of said right turning mechanism;

said plurality of horizontal pulleys of said right turning mechanism being attached to said spar adjacent to each of the plurality of right outer hubs;
said plurality of vertical pulleys of said right turning mechanism being attached to said thick batten of each of the plurality of right outer hubs;
said plurality of secondary lines of said right turning mechanism being engaged to both said plurality of horizontal pulleys of said right turning mechanism and said plurality of vertical pulleys of said right turning mechanism; and
said sail being attached to said plurality of secondary control lines of said right turning mechanism opposite said primary control line of said right turning mechanism.

10. The ram air rigid structure glider as claimed in claim 1 comprises,
said pilot pod being centrally positioned below said spar;
said pilot pod being connected below to said pod support beam;
said spar being attached to said pod support beam opposite said pilot pod; and
said pilot pod being partially covered by said windshield.

11. The ram air rigid structure glider as claimed in claim 1 comprises,
said left tip wand being attached adjacent to said left network connection opposite said spur;
said right tip wand being attached adjacent to said right network connection opposite said spur;
said pair of wings being formed by said sail, said spar, said plurality of left outer hubs, said plurality of right outer hubs, said plurality of intermediate hubs, said left control hub, said right control hub, said network of lines, said left network connection, and said right network connection; and
said tail being formed by said tail frame and said tail cover.

12. A ram air rigid structure glider comprises,
a pair of wings;
a tail;
a frame;
a sail;
a keel cone;
a tail cover;
a left turning mechanism;
a right turning mechanism;
a pilot pod;
said frame comprises a spar, a keel, a plurality of left outer hubs, a plurality right outer hubs, a plurality of intermediate hubs, a left control hub, a right control hub, a network of lines, a left network connection, a right network connection, a skid, and a tail frame;
said sail comprises a plurality of internal divisions, a plurality of thin battens, a plurality of cells, a leading edge, a ram air mouth, a left tip wand, and a right tip wand;
said left turning mechanism and said right turning mechanism each comprises a control stem, a pull tube, a primary control line, a plurality of secondary control lines, a plurality of horizontal pulleys, and a plurality of vertical pulleys;
said pilot pod comprises a pilot cavity, a windshield, and a pod support beam;
each of said plurality of left outer hubs, each of said plurality of right outer hubs, each of said plurality of intermediate hubs, said left control hub, and said right control hub each comprises a ring, a plurality of spokes, and a thick batten;
said plurality of internal divisions comprises a network hole and a plurality of flow holes;
said keel being positioned perpendicular to said spar;
said keel being centrally attached to said spar;
said left control hub being positioned adjacent to said keel along said spar;
said right control hub being positioned adjacent to said keel opposite said left control hub along said spar;
said plurality of left outer hubs being positioned adjacent to said left control hub opposite said keel along said spar;
said plurality of right outer hubs being positioned adjacent to said right control hub opposite said keel along said spar;
said plurality of intermediate hubs being positioned in between said left control hub and said plurality of left outer hubs and being positioned in between said right control hub and said plurality of right outer hubs;
said left network connection being attached to said spar adjacent to said plurality of left outer hubs;
said right network connection being attached to said spar adjacent to said plurality of right outer hubs;
said tail frame being positioned parallel to said spar;
said tail frame being attached perpendicular to said keel opposite said spar;
said skid being positioned perpendicular to said spar;
said skid being attached perpendicular to said keel opposite said spar;
said sail being evenly partitioned by said plurality internal divisions;
said plurality of thin battens delineating each of said plurality of internal divisions along said sail;
said plurality of cells being shaped by said plurality of internal divisions within said sail;
said keel cone being centrally positioned on said sail opposite said leading edge; and
said ram air mouth being positioned adjacent to said leading edge.

13. The ram air rigid structure glider as claimed in claim 12 comprises,
said plurality of spokes being radially connected to said ring;
said thick batten being positioned perpendicular to said spar and being positioned parallel to said keel;
said thick batten being connected below to said plurality of spokes;
said network of lines being attached to said left network connection and said right network connection;
said network of lines being attached to said plurality of spokes of said plurality of left outer hubs, to said plurality of spokes of said plurality of right outer hubs, to said plurality of spokes of said plurality of intermediate hubs, to said plurality of spokes of said left control hub, and to said plurality of spokes of said right control hub in between said left network connection and said right network connection; and
said ring of each of said plurality of left outer hubs, said ring of each of said plurality of right outer hubs, said ring of each of said plurality of intermediate hubs, said ring of said left control hub, and said ring of said right control hub being traversed through by said spar.

14. The ram air rigid structure glider as claimed in claim 12 comprises,
said plurality of flow holes being positioned around said network hole;
said network hole of each of the plurality of internal divisions being positioned collinear to each other;

said spar, said plurality of left outer hubs, said plurality of right outer hubs, said plurality of intermediate hubs, said left control hub, and said right control hub being enveloped by said sail;

said network hole of each of the plurality of internal divisions being traversed through by said network of lines;

said network hole of each of the plurality internal divisions being traversed through by said ring of each of said plurality of left outer hubs, by said ring of each of said plurality of right outer hubs, by said ring of each of said plurality of intermediate hubs, by said ring of said left control hub, and by said ring of said right control hub;

said network hole of each of the plurality internal divisions being traversed through by said plurality of spokes of each of said plurality of left outer hubs, by said plurality of spokes of each of said plurality of right outer hubs, by said plurality of spokes of each of said plurality of intermediate hubs, by said plurality of spokes of said left control hub, and by said plurality of spokes of said right control hub;

said thick batten of each of said plurality of left outer hubs, said thick batten of each of said plurality of right outer hubs, said thick batten of each of said plurality of intermediate hubs, said thick batten of said left control hub, said thick batten of said right control hub being sewn into every other of said plurality of internal divisions;

said left tip wand being draped over by said sail and being connected to said sail adjacent to said plurality of left outer hubs; and said right tip wand being draped over by said sail and being connected to said sail adjacent to said to said plurality of right outer hubs.

15. The ram air rigid structure glider as claimed in claim 12 comprises, said tail frame being enveloped by said tail cover;
said keel being covered by said keel cone;
said tail cover being attached to said keel cone opposite said sail;
said left tip wand being attached adjacent to said left network connection opposite said spur;
said right tip wand being attached adjacent to said right network connection opposite said spur;
said pair of wings being formed by said sail, said spar, said plurality of left outer hubs, said plurality of right outer hubs, said plurality of intermediate hubs, said left control hub, said right control hub, said network of lines, said left network connection, and said right network connection; and
said tail being formed by said tail frame and said tail cover.

16. The ram air rigid structure glider as claimed in claim 12 comprises, said control stem of said left turning mechanism being connected to said thick batten of said left control hub;
said control stem of said left turning mechanism being jointly attached to said pull tube of said left turning mechanism;
said pull tube of said left turning mechanism being attached to said primary control line of said left turning mechanism;
said primary control line of said left turning mechanism being connected to said plurality of secondary control lines of said left turning mechanism;
said plurality of horizontal pulleys of said left turning mechanism being attached to said spar adjacent to each of the plurality of left outer hubs;
said plurality of vertical pulleys of said left turning mechanism being attached to said thick batten of each of the plurality of left outer hubs;
said plurality of secondary lines of said left turning mechanism being engaged to both said plurality of horizontal pulleys of said left turning mechanism and said plurality of vertical pulleys of said left turning mechanism;
said sail being attached to said plurality of secondary control lines of said left turning mechanism opposite said primary control line of said left turning mechanism;
said control stem of said right turning mechanism being connected to said thick batten of said right control hub;
said control stem of said right turning mechanism being jointly attached to said pull tube of said right turning mechanism;
said pull tube of said right turning mechanism being attached to said primary control line of said right turning mechanism;
said primary control line of said right turning mechanism being connected to said plurality of secondary control lines of said right turning mechanism;
said plurality of horizontal pulleys of said right turning mechanism being attached to said spar adjacent to each of the plurality of right outer hubs;
said plurality of vertical pulleys of said right turning mechanism being attached to said thick batten of each of the plurality of right outer hubs;
said plurality of secondary lines of said right turning mechanism being engaged to both said plurality of horizontal pulleys of said right turning mechanism and said plurality of vertical pulleys of said right turning mechanism;
said sail being attached to said plurality of secondary control lines of said right turning mechanism opposite said primary control line of said right turning mechanism;
said pilot pod being centrally positioned below said spar;
said pilot pod being connected below to said pod support beam;
said spar being attached to said pod support beam opposite said pilot pod; and
said pilot pod being partially covered by said windshield.

17. A ram air rigid structure glider comprises,
a pair of wings;
a tail;
a frame;
a sail;
a keel cone;
a tail cover;
a left turning mechanism;
a right turning mechanism;
a pilot pod;
said frame comprises a spar, a keel, a plurality of left outer hubs, a plurality right outer hubs, a plurality of intermediate hubs, a left control hub, a right control hub, a network of lines, a left network connection, a right network connection, a skid, and a tail frame;
said sail comprises a plurality of internal divisions, a plurality of thin battens, a plurality of cells, a leading edge, a ram air mouth, a left tip wand, and a right tip wand;
said left turning mechanism and said right turning mechanism each comprises a control stem, a pull tube, a primary control line, a plurality of secondary control lines, a plurality of horizontal pulleys, and a plurality of vertical pulleys;
said pilot pod comprises a pilot cavity, a windshield, and a pod support beam;

each of said plurality of left outer hubs, each of said plurality of right outer hubs, each of said plurality of intermediate hubs, said left control hub, and said right control hub each comprises a ring, a plurality of spokes, and a thick batten;

said plurality of internal divisions comprises a network hole and a plurality of flow holes;

said keel being positioned perpendicular to said spar;

said keel being centrally attached to said spar;

said left control hub being positioned adjacent to said keel along said spar;

said right control hub being positioned adjacent to said keel opposite said left control hub along said spar;

said plurality of left outer hubs being positioned adjacent to said left control hub opposite said keel along said spar;

said plurality of right outer hubs being positioned adjacent to said right control hub opposite said keel along said spar;

said plurality of intermediate hubs being positioned in between said left control hub and said plurality of left outer hubs and being positioned in between said right control hub and said plurality of right outer hubs;

said left network connection being attached to said spar adjacent to said plurality of left outer hubs;

said right network connection being attached to said spar adjacent to said plurality of right outer hubs;

said tail frame being positioned parallel to said spar;

said tail frame being attached perpendicular to said keel opposite said spar;

said skid being positioned perpendicular to said spar;

said skid being attached perpendicular to said keel opposite said spar;

said plurality of spokes being radially connected to said ring;

said thick batten being positioned perpendicular to said spar and being positioned parallel to said keel;

said thick batten being connected below to said plurality of spokes;

said sail being evenly partitioned by said plurality internal divisions;

said plurality of thin battens delineating each of said plurality of internal divisions along said sail;

said plurality of cells being shaped by said plurality of internal divisions within said sail;

said keel cone being centrally positioned on said sail opposite said leading edge;

said ram air mouth being positioned adjacent to said leading edge;

said plurality of flow holes being positioned around said network hole; and said network hole of each of the plurality of internal divisions being positioned collinear to each other.

18. The ram air rigid structure glider as claimed in claim 17 comprises, said network of lines being attached to said left network connection and said right network connection;

said network of lines being attached to said plurality of spokes of said plurality of left outer hubs, to said plurality of spokes of said plurality of right outer hubs, to said plurality of spokes of said plurality of intermediate hubs, to said plurality of spokes of said left control hub, and to said plurality of spokes of said right control hub in between said left network connection and said right network connection;

said ring of each of said plurality of left outer hubs, said ring of each of said plurality of right outer hubs, said ring of each of said plurality of intermediate hubs, said ring of said left control hub, and said ring of said right control hub being traversed through by said spar;

said spar, said plurality of left outer hubs, said plurality of right outer hubs, said plurality of intermediate hubs, said left control hub, and said right control hub being enveloped by said sail;

said network hole of each of the plurality of internal divisions being traversed through by said network of lines;

said network hole of each of the plurality internal divisions being traversed through by said ring of each of said plurality of left outer hubs, by said ring of each of said plurality of right outer hubs, by said ring of each of said plurality of intermediate hubs, by said ring of said left control hub, and by said ring of said right control hub;

said network hole of each of the plurality internal divisions being traversed through by said plurality of spokes of each of said plurality of left outer hubs, by said plurality of spokes of each of said plurality of right outer hubs, by said plurality of spokes of each of said plurality of intermediate hubs, by said plurality of spokes of said left control hub, and by said plurality of spokes of said right control hub;

said thick batten of each of said plurality of left outer hubs, said thick batten of each of said plurality of right outer hubs, said thick batten of each of said plurality of intermediate hubs, said thick batten of said left control hub, said thick batten of said right control hub being sewn into every other of said plurality of internal divisions;

said left tip wand being draped over by said sail and being connected to said sail adjacent to said plurality of left outer hubs; and said right tip wand being draped over by said sail and being connected to said sail adjacent to said to said plurality of right outer hubs.

19. The ram air rigid structure glider as claimed in claim 17 comprises, said tail frame being enveloped by said tail cover;

said keel being covered by said keel cone;

said tail cover being attached to said keel cone opposite said sail;

said left tip wand being attached adjacent to said left network connection opposite said spur;

said right tip wand being attached adjacent to said right network connection opposite said spur;

said pair of wings being formed by said sail, said spar, said plurality of left outer hubs, said plurality of right outer hubs, said plurality of intermediate hubs, said left control hub, said right control hub, said network of lines, said left network connection, and said right network connection; and said tail being formed by said tail frame and said tail cover.

20. The ram air rigid structure glider as claimed in claim 17 comprises, said control stem of said left turning mechanism being connected to said thick batten of said left control hub;

said control stem of said left turning mechanism being jointly attached to said pull tube of said left turning mechanism;

said pull tube of said left turning mechanism being attached to said primary control line of said left turning mechanism;

said primary control line of said left turning mechanism being connected to said plurality of secondary control lines of said left turning mechanism;

said plurality of horizontal pulleys of said left turning mechanism being attached to said spar adjacent to each of the plurality of left outer hubs;

said plurality of vertical pulleys of said left turning mechanism being attached to said thick batten of each of the plurality of left outer hubs;

said plurality of secondary lines of said left turning mechanism being engaged to both said plurality of horizontal pulleys of said left turning mechanism and said plurality of vertical pulleys of said left turning mechanism;

said sail being attached to said plurality of secondary control lines of said left turning mechanism opposite said primary control line of said left turning mechanism;

said control stem of said right turning mechanism being connected to said thick batten of said right control hub;

said control stem of said right turning mechanism being jointly attached to said pull tube of said right turning mechanism;

said pull tube of said right turning mechanism being attached to said primary control line of said right turning mechanism;

said primary control line of said right turning mechanism being connected to said plurality of secondary control lines of said right turning mechanism;

said plurality of horizontal pulleys of said right turning mechanism being attached to said spar adjacent to each of the plurality of right outer hubs;

said plurality of vertical pulleys of said right turning mechanism being attached to said thick batten of each of the plurality of right outer hubs;

said plurality of secondary lines of said right turning mechanism being engaged to both said plurality of horizontal pulleys of said right turning mechanism and said plurality of vertical pulleys of said right turning mechanism;

said sail being attached to said plurality of secondary control lines of said right turning mechanism opposite said primary control line of said right turning mechanism;

said pilot pod being centrally positioned below said spar;

said pilot pod being connected below to said pod support beam;

said spar being attached to said pod support beam opposite said pilot pod; and said pilot pod being partially covered by said windshield.

* * * * *